United States Patent Office 3,417,146
Patented Dec. 17, 1968

3,417,146
PREPARATION OF NITRATED
AROMATIC ETHERS
Carl B. Linn, Prairie Village, Kans., and Jerome A. Vesely, Park Ridge, Ill., assignors to Universal Oil Products Company, Des Plaines, Ill., a corporation of Delaware
No Drawing. Continuation-in-part of application Ser. No. 511,996, Dec. 6, 1965. This application Mar. 31, 1967, Ser. No. 627,304
7 Claims. (Cl. 260—609)

ABSTRACT OF THE DISCLOSURE

Aromatic compounds which contain various substituents on the ring thereof are treated with a nitrogen acid in the presence of a hydrogen fluoride catalyst to prepare aromatic compounds containing nitro substituents on the ring without destroying the original compound.

This application is a continuation-in-part of our copending application Ser. No. 511,996 filed Dec. 6, 1965, now abandoned.

This invention relates to a process for the nitration of aromatic compounds and more particularly to a process for the nitration of diaryl ethers.

Hereinbefore, it has been very difficult to nitrate certain aromatic compounds and particularly aromatic ethers which may, in addition, contain various substituents on one or both of the aromatic rings. This is due to the fact that such compounds possess so much reactivity that during the conventional nitration process, which consists of nitrating said compounds with a nitration agent in the presence of a sulfuric acid catalyst, the compounds are destroyed by loss of these substituents on the ring and therefore no pure products can be isolated from the reaction mixture. However, it has now been discovered that aromatic ethers which may or may not contain various substituents on the ring may be subjected to a nitration process in such a manner that an effective nitration of the aforementioned compounds can be accomplished without loss or destruction of the starting material, thereby permitting the obtention of a relatively large yield of the desired product.

This preparation of nitrated aromatic compounds is of importance in the chemical field. For example, it is now possible to nitrate a diaryl ether to prepare compounds such as 4,4'-dinitrodiphenyl ether. This compound is an important intermediate in the preparation of reductively alkylated diaryl ether compounds which are useful as antioxidants and antiozidants which will protect various oils such as fuel oil, gasoline, etc.; foods such as butter, vegetable oil, fish oil, cheese, etc., and rubbers such as natural rubber, synthetic rubber, etc., without oxidative deterioration thereof with an accompanying formation of unwanted gums, rancidity or cracking, the unwanted reaction depending upon the particular substrate.

It is therefore an object of this invention to provide a process for the nitration of certain aromatic compounds.

A further object of this invention is to provide a process whereby certain aromatic compounds such as diaryl ethers which may contain various substituents on the ring thereof may be sufficiently nitrated without destroying the integrity of the starting material.

In one aspect, an embodiment of this invention resides in a process for the nitration of a diaryl ether which comprises treating said ether with a nitrogen acid in the presence of hydrogen fluoride at nitration conditions and recovering the resultant nitro-substituted diaryl ether.

A specific embodiment of this invention resides in a process for the nitration of diphenyl ether which comprises treating said diphenyl ether with nitric acid in the presence of hydrogen fluoride at a temperature in the range of from about −75° to about 30° C. and recovering the resultant 4,4'-dinitrodiphenyl ether and 2,4'-dinitrodiphenyl ether.

Other objects and embodiments will be found in the following further detailed description of this invention.

As hereinbefore set forth, it has now been discovered that aromatic compounds, and in particular, aromatic ethers, which may possess reactive substituents on the ring may be subjected to a nitration process in the presence of hydrogen fluoride in such a manner and at such a temperature in that the starting materials are not destroyed and the desired nitrated compound may thereafter be isolated in a relatively pure form from the reaction mixture. Furthermore, by effecting the reaction at temperatures within the range hereinafter set forth in greater detail, it is possible to obtain the reaction products in a solid state thereby permitting the recovery of said products from the unreacted starting materials, nitration agents and catalysts by a relatively inexpensive process of filtration rather than by an expensive process involving fractional distillation. It is to be understood that the term "substituted aromatic compounds" as used in the present specification and appended claims will refer primarily to aromatic ethers and thio-ethers.

Examples of these aromatic ethers and thioethers which may also possess reactive substituents on the ring will include diphenylether, 2-hydroxydiphenylether,
3-hydroxydiphenylether,
4-hydroxydiphenylether,
2,4'-dihydroxydiphenylether,
2-hydroxy-2'-chlorodiphenylether,
2-hydroxy-4'-chlorodiphenylether,
4-hydroxy-2'-chlorodiphenylether,
4-hydroxy-4'-chlorodiphenylether,
2-hydroxy-2'-bromodiphenylether,
2-hydroxy-4'-bromodiphenylether,
4-hydroxy-2'-bromodiphenylether,
4-hydroxy-4'-bromodiphenylether,
2-chloro-4'-hydroxydiphenylether,
2-hydroxy-2'-methyldiphenylether,
4-hydroxy-2'-methyldiphenylether,
4-hydroxy-4'-methyldiphenylether,
2-hydroxy-2'-ethyldiphenylether,
4-hydroxy-2'-ethyldiphenylether,
2-hydroxy-2'-isopropyldiphenylether,
4-hydroxy-2'-isopropyldiphenylether,
4-hydroxy-4'-isopropyldiphenylether,
2-hydroxy-2'-methoxydiphenylether,
4-hydroxy-2'-methoxydiphenylether,
4-hydroxy-4'-methoxydiphenylether,
2-hydroxy-2'-ethoxydiphenylether,
4-hydroxy-2'-ethoxydiphenylether,
4-hydroxy-4'-ethoxydiphenylether,
2-hydroxy-2'-propoxydiphenylether,
4-hydroxy-2'-propoxydiphenylether,
4-hydroxy-4'-propoxydiphenylether,
diphenylthioether,
2-hydroxydiphenylthioether,
3-hydroxydiphenylthioether,
4-hydroxydiphenylthioether,
2,4'-dihydroxydiphenylthioether,
2-hydroxy-2'-chlorodiphenylthioether,
2-hydroxy-4'-chlorodiphenylthioether,
4-hydroxy-2'-chlorodiphenylthioether,
4-hydroxy-4'-chlorodiphenylthioether,
2-hydroxy-2'-bromodiphenylthioether,
2-hydroxy-4'-bromodiphenylthioether, 4-hydroxy-2'-bromodiphenylthioether,
4-hydroxy-4'-bromodiphenylthioether,
2-chloro-4'-hydroxydiphenylthioether,
2-hydroxy-2'-methyldiphenylthioether,
4-hydroxy-2'-methyldiphenylthioether,
4-hydroxy-4'-methyldiphenylthioether,
2-hydroxy-2'-ethyldiphenylether,
4-hydroxy-2'-ethyldiphenylthioether,
2-hydroxy-2'-isopropyldiphenylthioether,
4-hydroxy-2'-isopropyldiphenylthioether,
4-hydroxy-4'-isopropyldiphenylthioether,
2-hydroxy-2'-methoxydiphenylthioether,
4-hydroxy-2'-methoxydiphenylthioether,
4-hydroxy-4'-methoxydiphenylthioether,
2-hydroxy-2'-ethoxydiphenylthioether,
4-hydroxy-2'-ethoxydiphenylthioether,
4-hydroxy-4'-ethoxydiphenylthioether,
2-hydroxy-2'-propoxydiphenylthioether,
4-hydroxy-2'-propoxydiphenylthioether,
4-hydroxy-4'-propoxydiphenylthioether, etc.

dinaphthylether, dinaphthylthioether, dianthroether, dianthrothioether, the corresponding substituted dinaphthyl-, dianthroethers, and thioethers, etc. It is to be understood that the aforementioned compounds are only representative of the class of compounds which may be nitrated and that the present process is not necessarily limited thereto.

The aforementioned substituted aromatic compounds are nitrated by treatment with a nitrating agent such as nitric acid, nitrous acid, etc., in the presence of hydrogen fluoride, said reaction being effected at temperatures ranging from about −70° to about 30° C. and preferably in a range of from about −70° to about 0° C. The hydrogen fluoride which is used may be anhydrous in nature or may be in an aqueous solution containing at least 80% hydrogen fluoride. As hereinbefore set forth, by utilizing these subatmospheric temperatures, the substituted aromatic compounds which are highly vulnerable to destruction in a process involving a conventional nitrating system such as a mixture of nitric acid and sulfuric acid may be reacted selectively to form the desired nitrated product. By varying the ratio of nitrating agent to substituted aromatic compound, it is possible to obtain a predominant proportion of a mononitrated product or a polynitrated product depending upon the aforementioned ratio, the ratio of nitrating agent to aromatic compound being in the range of from about 1:1 to about 10:1 moles of nitrating agent per mole of substituted aromatic compound.

The process of the present invention may be effected in any manner and may comprise either a batch or continuous type operation. For example, when a batch type operation is used, a quantity of the aromatic compounds to be nitrated is placed in an appropriate reaction apparatus such as an autoclave. In addition, if so desired, a substantially inert organic solvent such as n-pentane may be used. The apparatus is cooled to the desired reaction temperature utilizing an ice bath or a Dry-Ice/acetone bath and the nitration catalyst comprising hydrogen fluoride is pressured in. Following this, the nitrating agent such as nitric acid which may comprise a 70% or 100% solution of nitric acid is slowly added thereto while maintaining the temperature of the vessel and contents thereof in a predetermined range. The reaction mixture is then stirred for an additional period of time and thereafter the vessel and contents thereof are allowed to warm to room temperature. The reaction product is recovered and subjected to separation and recovery steps well known in the art, said steps involving washing, filtration and concentration.

It is also contemplated within the scope of this invention that the process described herein may be effected in a continuous manner of operation. When such a type of operation is used, the aromatic compound to be nitrated is continuously charged to a reaction vessel which is maintained at the proper operating conditions of temperature and pressure. In addition, the nitrating agent and catalyst are also charged thereto through separate streams. Upon completion of the desired residence time, the reaction product is continuously withdrawn from the reactor and separated by conventional means such as filtration at a reduced temperature from the unreacted nitrating agent and catalyst. The latter two compounds are separated and recycled to the reaction vessel while the former may be recovered and purified.

Examples of compounds which may be prepared include 2,4'-dinitrodiphenylether, 4,4'-dinitrodiphenylether, 2-hydroxy-4'-nitrodiphenylether, 4-hydroxy-4'-nitrodiphenylether, 2,4'-dihydroxy-4-nitrodiphenylether, 2-nitro-4-hydroxy-4'-chlorodiphenylether, 2-hydroxy-2'-chloro-4,4'-dinitrodiphenylether, 2,4'-dinitrodiphenylthioether, 4,4'-dinitrodiphenylthioether, 2 - hydroxy - 4'-nitrodiphenylthioether, 4-hydroxy-4'-nitrodiphenylthioether, 2,4'-dihydroxy-4 - nitrodiphenylthioether, 2-nitro-4-hydroxy-4'-chlorodiphenylthioether, 2-hydroxy-2'-chloro-4,4'-dinitrodiphenylthioether, 2-nitro-di-p-tolylether, 2,2'-dinitro-di-p-tolylether, etc. It is to be understood that the aforementioned compounds are only representative of the class of nitrated aromatic ethers which may be prepared according to the process described herein and that said process is not necessarily limited thereto.

The following examples are given to illustrate the process of the present invention which, however, are not intended to limit the generally broad scope of the present invention in strict accordance therewith.

Example I

In this example, 50 g. of diphenylether were placed in a 1 liter turbomixer which was thereafter cooled in an ice bath. Following this, 212 g. of hydrogen fluoride was pressured in and the autoclave and contents thereof cooled to a temperature of about 0° C. The mixture was continuously stirred while 20 g. of a 70% nitric acid solution was added thereto in four increments. The solution was maintained at a temperature in the range of from about 0° to about 10° C. for a total contact time of 31 minutes. At the end of this time, the product was recovered, extracted with benzene, washed with water and alkali. The resulting extract was dried over potassium carbonate and filtered. The product comprising red brown crystals was analyzed by infra-red and gas-liquid chromatography. The produce comprised 40% by weight of diphenylether, 12% by weight of mononitrodiphenylether and 45% by weight of dinitrodiphenylether. The composition of the dinitrodiphenylether was determined by infra-red analysis to consist of 5% 2,2'-dinitrodiphenylether, 45% 2,4'-dinitrodiphenylether and 50% of 4,4'-dinitrophenylether.

Example II

In this example, 50 g. of diphenylthioether are placed in a 1 liter turbomixer autoclave which is thereafter cooled by means of an ice bath to a temperature of about 0° C. After the autoclave has been cooled to this temperature 212 g. of hydrogen fluoride are added while the autoclave is maintained at this temperature. The mixture is continuously stirred while 20 g. of a 70% nitric acid solution is added thereto, in four aliquot portions. The mixture is continuously stirred and maintained at a temperature in the range of from about 0° to about 4° C. for a total contact time of approximately 60 minutes. At the end of this time, the autoclave and contents thereof are allowed to warm to room temperature and the product recovered. The reaction product is extracted with benzene, washed with water and alkali to remove any residual hydrogen fluoride which may still be present and dried over potassium carbonate. The dried extract is then filtered to recover the reaction product which will comprise a mixture of mononitrodiphenylthioether and dinitrodiphenylthioether, the latter comprising a mixture of 2,4'-dinitrodiphenylether and 4.4'-dinitrodiphenylether.

Example III

To a turbomixer autoclave is added 60 g. of di-p-tolylether, following which the autoclave is cooled by means of external cooling means such as an ice bath to a temperature of approximately 0° C. The catalyst comprising 212 g. of anhydrous hydrogen fluoride is pressured in while admixing thoroughly. The mixture is continuously stirred while 20 g. of a 70% nitric acid solution is added in four aliquot portions over a period of about 15 minutes. Upon completion of the addition of the nitric acid the mixture is continuously stirred for an additional 45 minutes while maintaining the temperature in the range of from about 0° to about 10° C. At the end of the desired residence time, the autoclave and contents thereof are allowed to warm to room temperature, the product is recovered from the autoclave, extracted with benzene, washed with water and alkali to remove any traces of hydrogen fluorides which may still be present. The resulting extract is dried over potassium carbonate and filtered to recover the reaction product. The reaction product will comprise a mixture of mononitrodibenzylethers and dinitro-di-p-tolylether, the latter comprising 2,2'-dinitrodi-p-tolylether.

We claim as our invention:

1. A process for the nitration of a diaryl ether which comprises treating said ether with a nitrating acid mixture consisting of a nitrogen acid and hydrogen fluoride at nitration conditions, and recovering the resultant nitro-substituted diaryl ether.

2. The process as set forth in claim 1, further characterized in that said nitration conditions include a temperature in the range of from about −75° C. to about 30° C.

3. The process as set forth in claim 1, further characterized in that said nitrogen acid comprises nitric acid.

4. The process as set forth in claim 1, further characterized in that said nitrogen acid comprises nitrous acid.

5. The process as set forth in claim 1, further characterized in that said diaryl ether comprises diphenyl ether and said nitro-substituted diarylether comprises 4,4'-dinitrodiphenylether and 2,4'-dinitrodiphenylether.

6. The process as set forth in claim 1, further characterized in that said diaryl ether comprises diphenylthioether and said nitro-substituted diarylether comprises 4,4'-dinitrodiphenylthioether and 2,4'-dinitrodiphenylthioether.

7. The process as set forth in claim 1, further characterized in that said diarylether comprises di-p-tolylether and said nitro-substituted diarylether comprises 2,2'-dinitro-di-p-tolylether.

References Cited

Urbański, Chemistry and Technology of Explosives, vol. I, the MacMillan Co., New York, 1964, pp. 549 to 555.

Simons et al., J. Am. Chem. Soc., vol. 63, pp. 608 to 609 (1941).

LELAND A. SEBASTIAN, *Primary Examiner.*

U.S. Cl. X.R.

260—612, 613, 645, 646, 688